US009697105B2

(12) United States Patent
Totale et al.

(10) Patent No.: US 9,697,105 B2
(45) Date of Patent: Jul. 4, 2017

(54) COMPOSABLE TEST AUTOMATION FRAMEWORK

(71) Applicant: EMC Corporation, Hopkinton, MA (US)

(72) Inventors: Sachin Gopaldas Totale, Bangalore (IN); Samir Yasin Vaidya, Bangalore (IN); Swati Bhatia, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 44 days.

(21) Appl. No.: 14/788,106

(22) Filed: Jun. 30, 2015

(65) Prior Publication Data
US 2016/0321166 A1    Nov. 3, 2016

(30) Foreign Application Priority Data
Apr. 30, 2015   (IN) .............................. 2217CHE2015

(51) Int. Cl.
*G06F 9/44* (2006.01)
*G06F 11/36* (2006.01)

(52) U.S. Cl.
CPC ...... *G06F 11/3664* (2013.01); *G06F 11/3692* (2013.01)

(58) Field of Classification Search
None
See application file for complete search history.

(56) References Cited

U.S. PATENT DOCUMENTS

| 5,600,789 | A  | * | 2/1997  | Parker ................. | G06F 11/3688 |
|           |    |   |         |                         | 714/38.11    |
| 6,502,102 | B1 | * | 12/2002 | Haswell .............. | G06F 11/3664 |
| 9,141,379 | B2 | * | 9/2015  | Boden ................ | G06F 11/3676 |
| 2003/0041288 | A1 | * | 2/2003 | Kolawa ............... | G06F 11/3664 |
|           |    |   |         |                         | 714/38.1     |
| 2007/0038890 | A1 | * | 2/2007 | El Far ................. | G06F 11/3688 |
|           |    |   |         |                         | 714/25       |
| 2009/0158094 | A1 | * | 6/2009 | Evans ..................... | H04L 43/50   |
|           |    |   |         |                         | 714/37       |
| 2009/0281982 | A1 | * | 11/2009 | Nigul ........................ | G06F 8/73    |
| 2010/0146420 | A1 | * | 6/2010 | Bharadwaj ............ | G06F 3/0481  |
|           |    |   |         |                         | 715/764      |

(Continued)

OTHER PUBLICATIONS

Vasilev, "Behaviour Driven Development with Java", Jul. 2011, JUG Bulgaria, Published at https://qatestingtools.com/sites/default/files/testing-tool-presentations/jbehave_and_selenium.pdf.*

(Continued)

*Primary Examiner* — Wei Zhen
*Assistant Examiner* — Hossain Morshed
(74) *Attorney, Agent, or Firm* — Chamberlain, Hrdlicka

(57) ABSTRACT

A method for composable test automation includes executing a story by, for each step in a story, receiving a call for the step in the story, categorizing the step to identify a portion of a web application executable being tested by the step, selecting an application testing interface corresponding to the portion of the web application executable, converting the call to commands, transmitting the command to the application testing interface, receiving output from the application testing interface based on executing the commands, and transmitting the output. The method further includes generating a story report from executing the story, and storing the story report.

15 Claims, 6 Drawing Sheets

(56) References Cited

U.S. PATENT DOCUMENTS

| | | | |
|---|---|---|---|
| 2011/0119652 A1* | 5/2011 | Yu | G06F 9/4428 717/108 |
| 2011/0126158 A1* | 5/2011 | Fogarty | G06F 3/0481 715/835 |
| 2014/0075242 A1* | 3/2014 | Dolinina | G06F 11/3672 714/27 |
| 2014/0201701 A1* | 7/2014 | Boden | G06F 8/10 717/100 |
| 2014/0201712 A1* | 7/2014 | Boden | G06F 11/3684 717/124 |
| 2014/0201713 A1* | 7/2014 | Boden | G06F 11/3692 717/124 |
| 2014/0279606 A1* | 9/2014 | Storm | G06Q 30/0283 705/317 |
| 2014/0366005 A1* | 12/2014 | Kozhuharov | G06F 11/3696 717/125 |
| 2015/0113331 A1* | 4/2015 | Bhattacharya | G06F 11/3688 714/38.1 |
| 2015/0134694 A1* | 5/2015 | Burke | G06F 17/30424 707/769 |
| 2016/0077832 A1* | 3/2016 | Bhattacharyya | G06F 8/77 717/101 |
| 2016/0085663 A1* | 3/2016 | Best | G06F 11/3692 714/38.1 |

OTHER PUBLICATIONS

EMC, "Getting Started with xCP 2.0", XCP2.0 Self-Paced Tutorial, Dec. 2012 (207 pages).

"EMC Documentum xCP Designer Help Version 2.0 User Guide", EMC Corporation, 2012 (325 pages).

"EMC Documentum xCelerated Composition Platform Designer Help", Version 2.1 User Guide, EMC Corporation, Corporate Headquarters, Hapkinton, MA, 2009-2014 (373 pages).

"EMC Documentum xCelerated Composition Platform:", Version 2.1 Developer Guide, EMC Corporation, Corporate Headquarters, Hopkinton, MA, 2009-2014 (82 pages).

"JBehave", Writing extual Stories, http://jbehave.org/reference/stable/developing-stories.html#writing, Version 4.0.1 published Jul. 6, 2015 (44 pages).

* cited by examiner

FIG. 6

COMPOSABLE TEST AUTOMATION FRAMEWORK

CROSS-REFERENCE TO RELATED APPLICATIONS

This application claims priority, under 35 U.S.C. §119(a), to Indian Patent Application No. 2217/CHE/2015, filed on Apr. 30, 2015, and entitled: "COMPOSABLE TEST AUTOMATION FRAMEWORK."

BACKGROUND

The development and deployment of web applications is a multistage process. A developer obtains or generates requirements documents listing the requirements of the web application and generates a software design based on the requirements documents. The developer may then create the web application using the software design. After creating or during creation of the web application, the developer tests portions of the web application. Testing often involves executing the web application under differing conditions. During testing, testers may identify unexpected and erroneous results to occur. The tester reports the unexpected and erroneous results, which are then corrected by the developer, and the testing continues. Once the web application satisfies testing, the web application is deployed.

BRIEF DESCRIPTION OF DRAWINGS

FIG. 6 shows an example in accordance with one or more embodiments of the technology.

DETAILED DESCRIPTION

Figure 1:
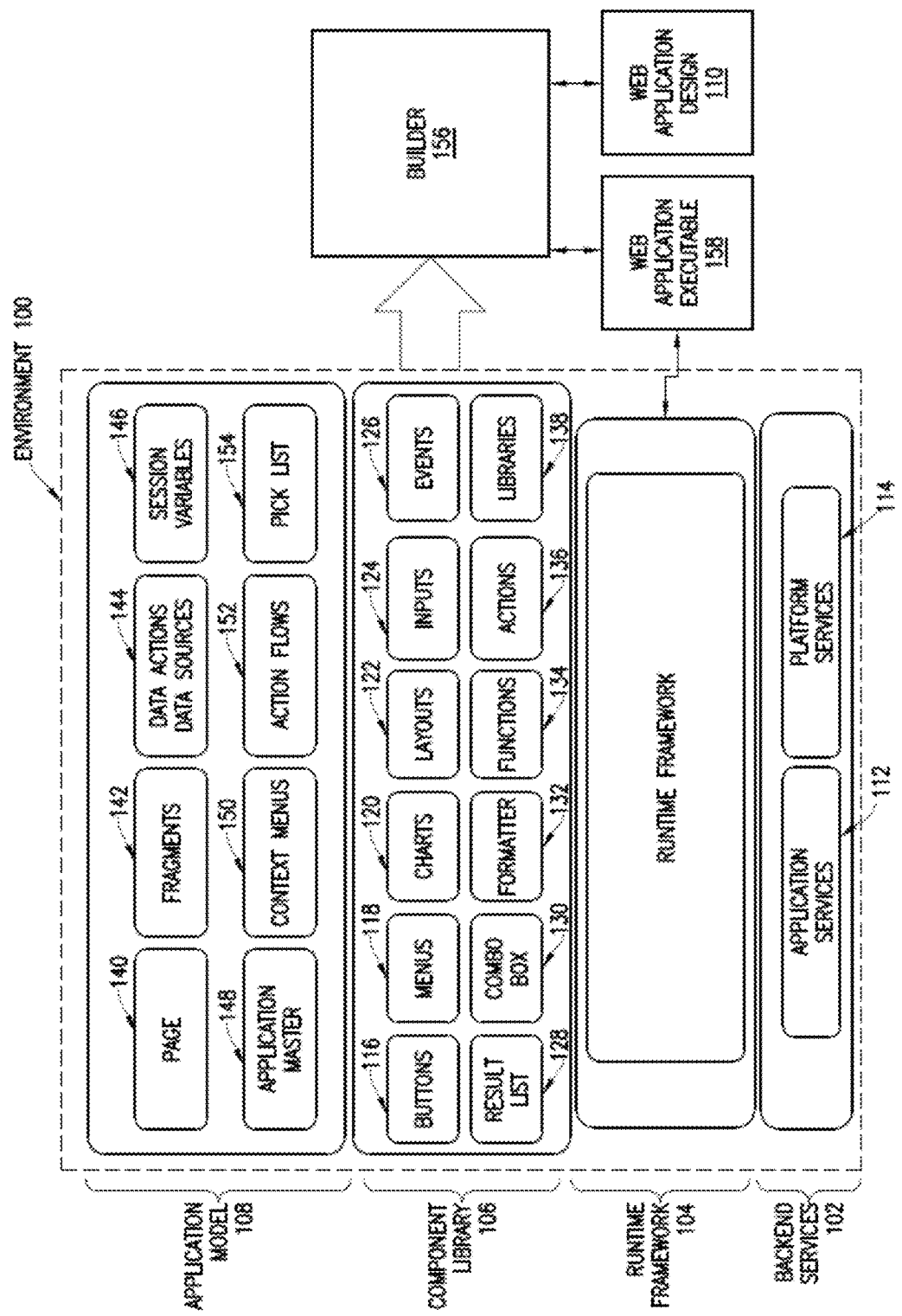
FIGS. 1 and 2 show schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed toward behavior driven testing with automated selection of the interface corresponding to the portion of the application being tested. In particular, one or more embodiments are directed to a story based mechanism for testing a web application in a composable environment. Rather than manually entering data into fields to determine whether the expected results are received or creating script-based code to test a web application, testers write stories. Because a story may test different portions of the application or even the development environment, one or more embodiments are directed to categorizing steps in a story and executing those steps on the portion of the web application using the corresponding interface.

FIG. 1 shows a schematic diagram of a system in accordance with one or more embodiments of the technology. Specifically, FIG. 1 shows a schematic diagram of an environment (100) for developing and executing a web application that implements the context menu fragment management. In one or more embodiments of the technology, the environment (100) is an application designer. In particular, the application designer includes functionality to assist a user in composing a web application. Composing an application differs from developing an application in that, rather than writing code, a user drags and drops components and enters parameters into user interface fields. Because the environment (100) assists a user in composing an application, the environment may be referred to as a composable environment.

As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158).

In one or more embodiments of the technology, the component library (106) is a library of application components that a developer may add to the web application design (110). In other words, the developer may select components from the component library (106) to add functionality to the web application design (110). The component library (106) may include user interface (UI) components and processing components.

In one or more embodiments of the technology, UI widgets are components that are displayed to an end user. In other words, instances of the UI widgets are displayed on a display device. In one or more embodiments of the technology, the UI widgets may include, but are not limited to, buttons (116) (e.g., radio buttons, common buttons), menus (118) (e.g., drop down menu, check boxes), charts (120), layouts (122), inputs (e.g., fields) (124) and combo boxes (130). UI widgets in the component library may each be associated with a set of options. The set of options define the execution of the UI widget. Namely, the set of options define how a particular instance of the component is executed. Options associated with the UI widgets may include formatting, any text that is displayed, any action that is to be performed when the UI widget is selected, other options, and/or any combination thereof. The action may be to: perform an operation on the page, transition to a specific static page, evaluate an expression to determine the page for transitioning, update one or more instances of a business object type, and/or perform another operation.

In one or more embodiments of the technology, the expression may specify one or more data sources and operations to perform on the data from one or more data sources. A data source is a location of data that is not within the expression. For example, the data source may be another portion of the application page, a data repository, returned data for an instance of a business object type, or another data source. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page. The result of evaluating an expression may be data for display on a webpage, a particular query to a data source, another result, or a combination thereof.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components is discussed below.

Formatter (132) are instructions, which enable arranging of the data in specific formats in accordance with one or more embodiments of the technology. A formatter may be application to number, date time values, other values, or a combination thereof. In accordance with one or more embodiments of the technology, functions (134) are the re-usable piece of code, which takes a set of inputs and returns an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files, which constitute utility and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), a pick list (154), and a view data service. Each of these components of the application model is described below.

A page (140) in the application model (108) is a template for a webpage. In other words, a page in the application model (108) is a template for a complete and individual document that is displayable to the end user. In one or more embodiments of the technology, a page in the development environment is a generic template in that the page is generic to any business object type. The generic template may include instructions for defining a webpage of a particular type, such as, for example, a create webpage, an update webpage, a validate webpage, and a delete webpage. Such instructions may include, for example, an instruction to iterate through each attribute type of the business object type and generate a field or other UI widget for the attribute type and a label in a webpage.

An activity fragment (142) represents at least a portion of an activity. In other words, an activity is a defined sequence of actions that an end user may perform using the web application. An activity fragment is a portion of the defined sequence of actions. Data actions and data sources (144) define the storage structure and storage location of the data and the actions to perform on the data.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. In other words, context menus are selected in a same or similar manner, but have options that are dependent on the context in which the context menu is displayed.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items (154) may be selected. In other words, more than one displayed item may be selected from a pick list.

The web application design (110) is a particular design of a web application created by a developer. Specifically, the web application design (110) includes instances of the components of the application model (108) and component library (106), may execute on the runtime framework (104) and use the backend services (102).

The web application design (110) is connected to a builder (156) in accordance with one or more embodiments of the technology. The builder (156) provides a UI for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The UI of the builder (156) may include editor features and sub-systems. The editor features may include editors for modifying various aspects or views of the web application design, and/or a builder UI to assist in the development of the web application design in accordance with one or more embodiments of the technology. For example, the editors may include business object types, documents, cases, searches, reports, pages, roles, apps, widgets, and process editors. The builder UI may include a new artifact wizard, add-on top-level menu, add-on tool bar buttons, context menus, an artifacts properties page, and a model editor.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, package and deploy the web application. The builder (156) may also include components functionality to perform source control and project/library management.

Figure 2:
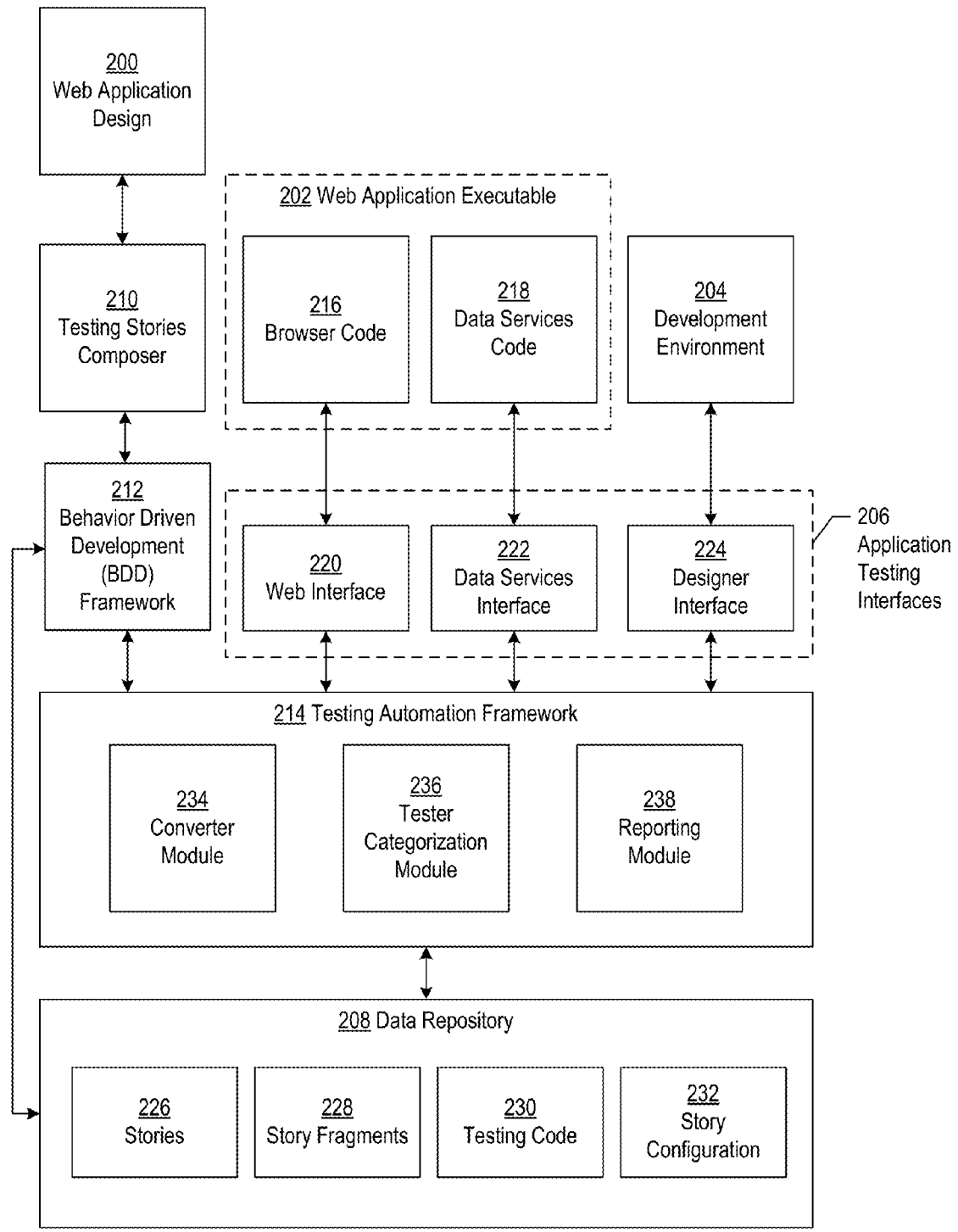

Once a web application is composed, a system may be used to test the web application. FIG. 2 shows a system in accordance with one or more embodiments of the technology. As shown in FIG. 2, the second environment may include the web application design (200), web application executable (202), development environment (204), data repository (208), testing stories composer (210), behavior driven development (BDD) framework (212), application testing interfaces (206), and testing automation framework (214). Each of these components is described below.

In one or more embodiments of the technology, the web application design (200) corresponds to the web application design (110) discussed above with reference to FIG. 1. The web application executable (202) in FIG. 2 corresponds to the web application executable (158) in FIG. 1. In FIG. 2, the web application executable (202) is shown with components of browser code (216) and data services code (218). The browser code (216) corresponds to the user interface portion of the web application executable (202) that is viewable by an end user of the web application executable (202). For example, the browser code (216) may correspond to the portion of the web application executable (202) executing in a web browser (not shown).

In one or more embodiments of the technology, the data services code (218) corresponds to backend code of the web application executable (202). For example, the data services code (218) may correspond to a portion of the web application executable (202) that executes on a backend server. The data services code (218) may have an application programming interface (not shown) by which the browser code (216) may communicate with the data services code (218).

Continuing with FIG. 2, the development environment (204) corresponds to the environment (100) shown in FIG. 1. In particular, one or more embodiments may provide a mechanism to not only test the web application executable (202), but also test the development environment (204) used to compose the web application executable (202).

In one or more embodiments of the technology, the application testing interfaces (206) correspond to interfaces for testing each portion of the application and development environment (204). In particular, each interface includes functionality to interact with a particular portion of the web application executable (202) or development environment (204).

For example, a web interface (220) is software code that may include functionality to interact with the browser code (216). In particular, the web interface (220) may include functionality to insert data and select user interface widgets into the web browser in a similar manner to a human interacting with the web browser. Thus, the web interface (220) may test the browser code (216). In one or more embodiments of the technology, the web interface (220) is a web plug-in. In other words, the web interface (220) may be a plug-in to the web browser that is configured to receive commands.

The data services interface (222) is software code that includes functionality to interact with the data services code (218) in accordance with one or more embodiments of the technology. In one or more embodiments, the data services interface (222) bypasses the browser code (216) when interacting with the data services code (218). Rather, the data services interface (222) includes functionality to use the application programming interface (API) of the data services code (218) in order to interact with the data services code (218). In one or more embodiments, the data services interface (222) may correspond to executable code.

In one or more embodiments of the technology, the designer interface (224) is software code that includes functionality to interact with the development environment (204). For example, the designer interface (224) may include functionality to interact with different portions of the development environment to create or update a web application. The designer interface (224) may be, for example, an Eclipse plug-in. Eclipse is an integrated development environment maintained by the Eclipse Foundation.

In one or more embodiments of the technology, the data repository (208) is any type of storage unit and/or device (e.g., a file system, database, collection of tables, or any other storage mechanism) for storing data. Further, the data repository (208) may include multiple different storage units and/or devices. The multiple different storage units and/or devices may or may not be of the same type or located at the same physical site. The data repository (208) includes functionality to store stories (226), story fragments (228), story configurations (232), and testing code (230). Each of these is described below.

Stories (226) are scenarios written in sentence form that are capable of being read by a human regardless of application coding experience. Each story (226) describes a scenario and the resulting behavior of the application that should occur. In one or more embodiments of the technology, stories are written using keywords. The keywords may include "Given", "When", "And", and "Then", which each may denote a start of a clause in the story. "Given" keyword is used to specify a set of pre-existing conditions, such as being logged in as a certain type of user. "When" and "And" keywords may describe the scenario, including steps and attributes that are performed in the scenario. "Then" keyword may denote the expected result from performing the scenario.

Stories (226) may reference one or more story fragments (228) in accordance with one or more embodiments of the technology. A story fragment (228) is a portion of a story. In other words, a story fragment may be a portion of a scenario that is to be included in multiple stories. Each of the multiple stories may include a reference to the story fragment. Thus, during runtime, the story fragment may be incorporated into each of the multiple stories.

The following is an example of a story fragment and a story referencing the story fragment.

```
1.  Scenario: common person input fields
2.  Meta:
3.  @id common_person_input_fields
4.  When I type text <first_name> in first_name
5.  And I type text <last_name> in last_name
6.  And I type text <address> in address
7.  Story: Employe operations
8.  @storyId: employe operation
9.
10. Scenario: I want to create employe using story fragment
11. Meta:
12. @defaultCompany EMC Services
13. @scenarioId create_employee
14. When I navigate to page auto_create_employee_or_
15. Then I am on page auto_create_employee_or_
16. When Set active container to create_employe_fragment
17. Then Active container is create_employe_fragment
18. When include steps from fragment
       stories/person/fragment/person.fragment#{id:common_person_inpu
       t_fields}
19. as is
20. When I type text <designation> in designation
21. And I type text <employee_id> in employee_id
22. And I type text #login_user# in company
23. When I click button button
24. Then I am on page auto_create_employee_or_
```

In the above example, lines 1-8 are a story fragment that specifies a portion of a scenario in which a user submits their name and address. Lines 10-24 are a story that may reference the story fragment. In particular, line 18 includes a reference to the story fragment in lines 1-8. In the story, lines 14, 16, 18, and 20-23 each describe steps of the scenario that a user may perform. Lines 15, 17, and 24 each describe the expected result that the story is testing. Namely, lines 15, 17, and 24 define the result being tested.

In one or more embodiments of the technology, testing code (230) may correspond to executable code that, when executed, perform the steps of the story. In some embodiments, the executable code may be written in a scripting language, such as JavaScript. In some embodiments, a separate test code exists for each type of step that may exist in a story.

Continuing with FIG. 2, the story configurations (232) include configurations for the story. In one or more embodiments of the technology, a story configuration includes the code interface for executing steps in one or more stories. In other words, the code interface describes maps steps and parameters in the steps to testing code (230) that executes the step. Because multiple stories may have the same step, but with different parameters, a code interface for a step may be defined once and used for the multiple stories.

In one or more embodiments, the code interface may include one or more annotations (not shown). The annotations specify information about the testing. For example, an annotation may specify the portion of the web application executable (202) or development environment being tested. By way of another example, an annotation may be a step annotation that matches a keyword in the story.

Continuing with FIG. 2, the testing stories composer (210) corresponds to a user interface for assisting a user in creating a story. For example, the testing stories composer (210) may be a word processing application, a test development application, or any other application.

In one or more embodiments of the technology, the BDD framework (212) includes functionality to iterate through a story, obtain the corresponding interface, and issue a call using the code interface in accordance with one or more embodiments of the technology. In one or more embodiments, the BDD framework may be a third party framework. An example of such a third party framework is JBehave developed by jbehave.org.

Continuing with FIG. 2, a testing automation framework (214) is interposed between the BDD framework (212) and the application testing interfaces (206). The testing automation framework (214) corresponds to hardware, software, firmware, or any combination thereof that includes functionality to execute the stories (226). In one or more embodiments of the technology, the testing automation framework (214) includes a converter module (234), a tester categorization module (236), and a reporting module (238). The converter module (234) includes functionality to receive a call from the BDD framework (212) and convert the call to a set of one or more commands. The tester categorization module (236) includes functionality to categorize the call based on the portion of the web application executable (202) being tested or the development environment (204) and transmit the commands to the corresponding application testing interface (206). The reporting module (238) includes functionality to receive output from the test, transmit the output, and generate one or more reports based on the output. For example, the reports may be story reports that describe the results of executing a particular story. By way of another example, the output may be a testing report that describes the overall results of executing multiple stories.

While FIGS. 1 and 2 shows a configuration of components, other configurations may be used without departing from the scope of the technology. For example, various components may be combined to create a single component. As another example, the functionality performed by a single component may be performed by two or more components.

Figure 3:
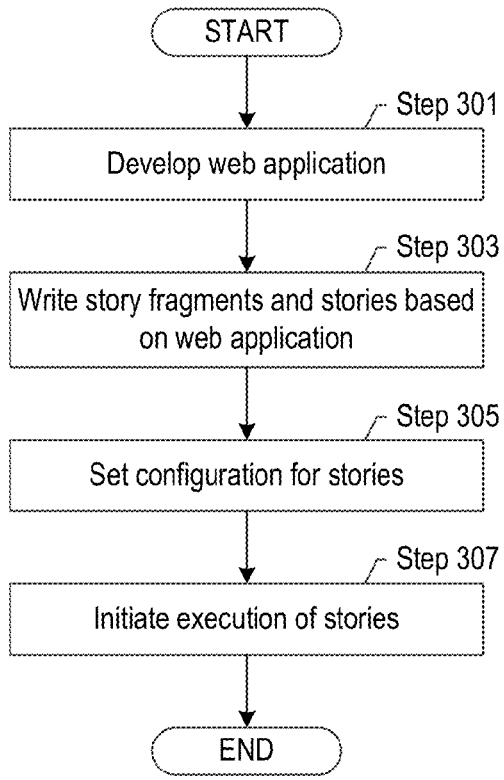
FIGS. 3, 4, and 5 show flowcharts in accordance with one or more embodiments of the technology.
Figure 4:
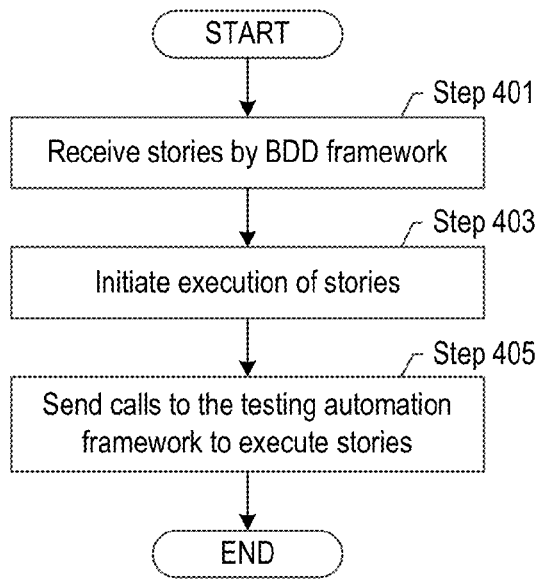
Figure 5:
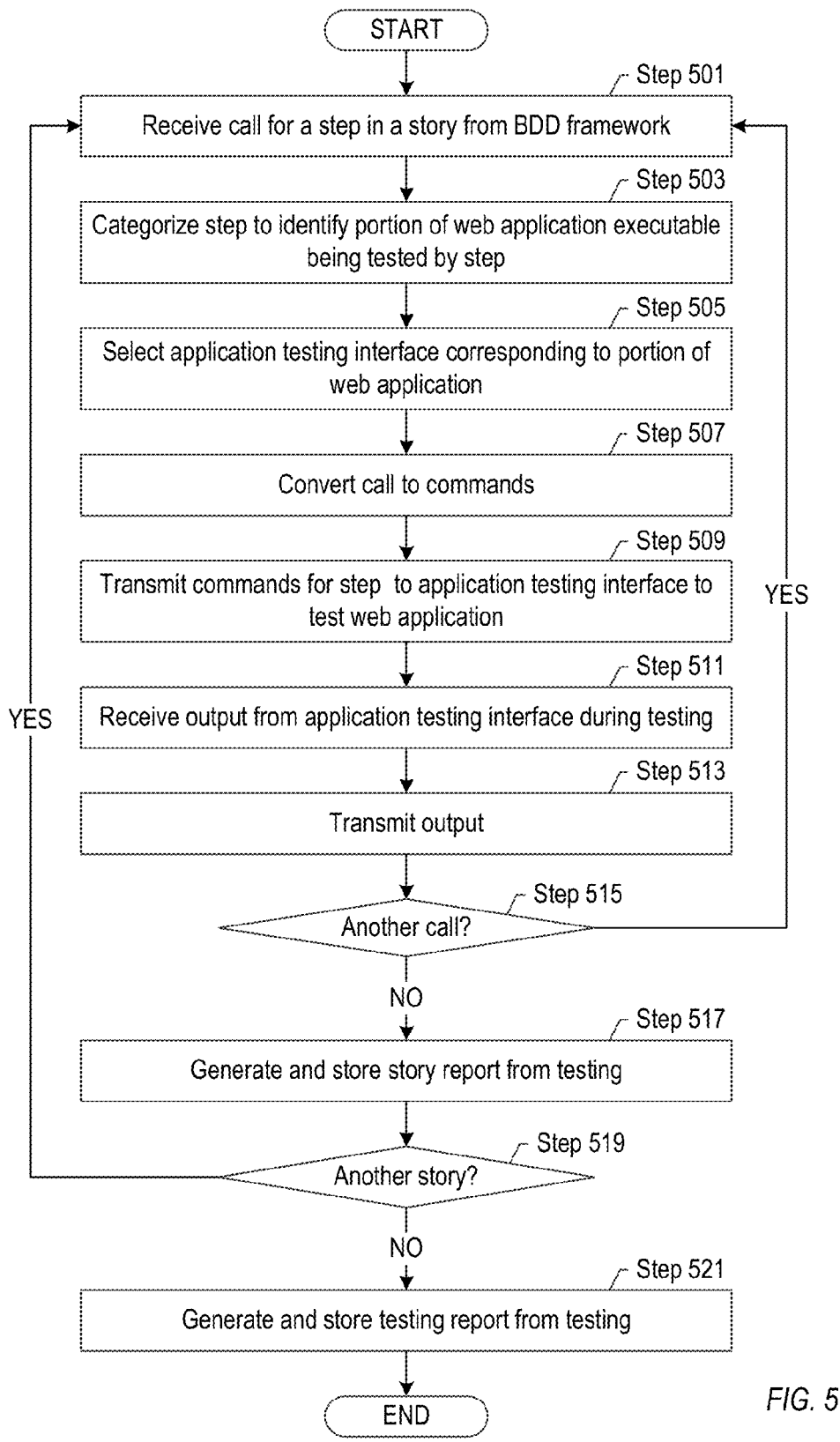

FIGS. 3-5 show flowcharts in accordance with one or more embodiments of the technology. The flowcharts shown in FIGS. 3-5 may be performed using the systems described above with reference to FIGS. 1 and 2. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 3 shows a flowchart for one or more users to develop and test a web application in accordance with one or more embodiments of the technology. In Step 301, the user develops the web application. In particular, the development environment shown in FIG. 1 facilitates an expression-based development of a web application. Thus, using the developer tools offered by the development environment, a user might drag and drop components into a web application design to define various components of the web application design. Some of the components may have predefined templates and logic. In such a scenario, once dragged into the web application design, the user may submit values of various parameters of the components. For example, the user may submit a unique identifier, any references, or any other information.

In Step 303, story fragments and stories are written based on the web application in accordance with one or more embodiments of the technology. Based on the web application, one or more users may identify features that the users wish to test. If a feature is to be tested, the users may write one or more stories that involve the use of the feature in different manners. The story describes the behavior of the system in response to a particular scenario. If a portion of a scenario is to be repeated across multiple stories, the user may compose a story fragment for the portion of the scenario. Then, for each story that uses the portion, the user may merely refer to the story fragment by the identifier of the story fragment.

In one or more embodiments of the technology, in Step 305, the user sets configurations for the stories. For example, a test developer may define code interfaces and test code for each possible step in the stories. Because stories may repeat steps with only having different parameters (e.g., different inputs to the web application executable), the number of steps written by the test developer may not have to write as comprehensively as the number of stories.

In Step 307, execution of the stories is initiated in accordance with one or more embodiments of the technology. In one or more embodiments, initiating execution of the stories include selecting one or more stories for execution and requesting that the BDD framework starts execution.

FIG. 4 shows a flowchart for a BDD framework to execute stories in accordance with one or more embodiments of the technology. In Step 401, the BDD framework receives stories. The BDD framework may receive the stories directly or indirectly. For example, the BDD framework may receive stories directly by a user composing the stories using a user interface of the BDD framework. The BDD framework may receive stories indirectly, such as by a user providing an identifier of a folder that includes stories. In Step 403, execution of the stories is initiated. In one or more embodiments of the technology, through an interface of the BDD, the user may specify a story or a set of stories for execution. In response, the BDD framework obtains the story or set of stories and starts executing the stories.

In Step 405, the BDD framework sends calls to the testing automation framework to execute the stories. In one or more embodiments, for each story, the BDD framework may perform the following steps. The BDD framework parses the story. For each step in the story, the BDD identifies the code interface matching the step. The BDD framework issues a call to the method referred to in the code interface using parameters from the step. The call is routed to the testing automation framework in accordance with one or more embodiments of the technology.

FIG. 5 shows a flowchart for performing operations by the testing automation framework in accordance with one or more embodiments of the technology. In Step 501, a call for a step in a story is received from the BDD framework in accordance with one or more embodiments of the technology. In one or more embodiments of the technology, the testing automation framework may receive a method call from the BDD framework. The method call includes an identifier of a method and parameters defined for the method.

In Step 503, the step is categorized to identify the portion of the web application executable being tested by the step in accordance with one or more embodiments of the technology. In one or more embodiments of the technology, each method call code is associated with a portion of the web application executable or development environment. For example, the interface for the method call may be defined within an interface that inherits from a parent interface that is explicitly defined for the portion of the web application. In some embodiments, the method call code is explicitly associated in the testing automation framework with the portion of the web application. In one or more embodiments of the invention, when BDD framework receives a method call to execute a step, the BDD framework may perform the following. Depending on the categorization defined at interface (in which the step method is defined), the corresponding step execution get initiated. The step execution proxy may perform the following (i) conversion of step into command; and (ii) executing the step in context of appropriate web application portion.

In Step 505, the application testing interface corresponding to the portion of the web application executable is selected in accordance with one or more embodiments of the technology. In particular, the testing automation framework, based on the identified portion of the web application, determines the particular application testing interface to invoke for the method call.

In Step 507, the call is converted to commands in accordance with one or more embodiments of the technology. In one or more embodiments of the technology, the method call is associated with a set of commands. For example, the set of commands may be each of the commands in the test code for the call.

In Step 509, the commands for the step are transmitted to the application testing interface to test the web application in accordance with one or more embodiments of the technology. In one or more embodiments of the technology, the commands are transmitted, one at a time, to the application testing interface. The application testing interface interfaces with the corresponding portion of the web application executable or with the development environment to request performance of the operation in the commands. By way of an example, if the command is to enter an item of data in a field, the testing automation framework may submit a command to the web interface. Within the browser window, the web interface automatically enters the data item in the field. By way of another example, if the command is to perform an operation in the data services code, the testing automation framework sends the command via the data services interface to the data services code. In response, the data services code performs instruction in the command.

In Step 511, output from the application testing interface is received during testing in accordance with one or more embodiments of the technology. In the case of the browser code, the output may be visual output that is displayed, an automated message that an operation completed successfully, the expected result (e.g., display a certain page of the web application), or an error notice from the web application. In the case of the data services code, the output may be an automatic response that the command completed successfully or a failure in one or more embodiments of the technology. In some embodiments, output is not received without a subsequent command. For example, the data services portion of the application may update a portion of a database, and executing a subsequent command may be performed to determine whether the update was performed correctly. Additionally, the testing automation framework may further track the execution of the commands and generate output based on the tracking. For example, the testing automation framework may keep track of the length of time for the web application executable to complete the operation requested.

In Step 513, the output is transmitted in accordance with one or more embodiments of the technology. In one or more embodiments of the technology, during execution, the system may transmit output to a user interface. Thus, the user may view the output from executing the commands. In one or more embodiments of the technology, the system may transmit output to a log file.

In Step 515, a determination is made whether another call is received in accordance with one or more embodiments of the technology. In particular, a determination is made whether another call is received for the same story. Because each story may be a different scenario, the system may reset between stories. However, if a call is received for the same story, then the system continues under the current state of the web application executable or development environment. If another call is received, the flow may proceed to Step 501.

In Step 517, a story report from the testing is generated and stored in accordance with one or more embodiments of the technology. The story report may include information about the particular story, such as success or failure of execution (e.g., did results match). The story report may also include the tracking information gathered in Step 511. Generating the story report may be based on templates or predefined in code.

In Step 519, a determination is made whether another story is being tested in accordance with one or more embodiments of the technology. In particular, a determination is made whether the test is testing another story. If another story is being tested, then the flow may proceed to Step 501. Otherwise, the flow may proceed to Step 521.

In Step 521, a testing report from the testing is generated and stored in accordance with one or more embodiments of the technology. In one or more embodiments, the testing report lists the total number of stories that completed successfully, and failed. The testing report may further list types of failures and portions of the web application executable that had the failures. Generating the testing report may be performed using templates or predefined code.

The following example is for explanatory purposes only and not intended to limit the scope of the technology. The following is an example of a story that includes both a data services portion and a user interface portion.

```
 1. Scenario: XCPUIC-14001_02
 2. !-- Following two steps from (Server side code) portion of the
     application, the step interface "UserSteps.java" for these steps are
     used
 3. When I connect to docbroker #ravis_ip# at docbrokerPort,1589
 4. And I login to repository #repo_name# with user dmadmin and
     password password
 5.
 6. !-- All below steps are from UI (browser side code) portion of the
     application, the step interface "NavigationSteps.java" for following
     two step steps
 7.
 8. When I navigate to page sun_create_s1_meeting
 9. Then I am on page sun_create_s1_meeting
10.
11. When I type text Patch Release in meeting_subject
12. And I add text Open Issues in agenda
13. And I add text Regressions in agenda
14. And I add text Scoping in agenda
15. And I type number 2.5 in duration
16. And I type date-time 2016-02-02T00:00:00+05:30 in occurs_on
17. And I add number 93869 in attendee_ids
18. And I add number 143903 in attendee_ids
19. And I add number 143903 in attendee_ids
20. And I clear notifications
21. And I click button button
```

-continued

```
22. Then dataservice sun_da_def_create_s1_meeting execution
     completed
23. Then the success notification is displayed
24.
25. When I navigate to page sun_s1_meetings
26. Then I am on page sun_s1_meetings
27. Then result list results_list is loaded
28.
29. When I select row in result list results_list at index 0
30. And I open context menu on selected row in result list results_list
31. Then context menu item contextmenu_action7 is disabled
32.
33. When I click on context menu item contextmenu_action2
34. Then action flow Link Book is launched
35. When I select row in result list results_list at index 0
36. And I click on action flow button Next >
37. And I type text Must Read in book_review
38. And I click on action flow button Finish
39. And I click Yes button of the confirmation dialog
40. Then action flow Link Book is completed
41.
42. When I select row in result list results_list at index 0
43. And I open context menu on selected row in result list results_list
44. Then context menu item contextmenu_action7 is enabled
```

In the example story, lines 3 and 4 correspond to the data services portion. The data services portion may have a story configuration as shown in the following interface section entitled "User Steps". The "User Steps" interface may include additional method interfaces that are not shown. As shown below, User Steps inherits from Abstract Steps interface. Line 3 in the Story above, matches lines 67-72 of the interface below. Thus, when the BDD framework executes line 3 of the story, the BDD framework calls the "loginwithDocbrokerDetails" method listed in lines 67-42. The test automation framework determines that "loginwithDocbrokerDetails" is for a data services, and therefore, invokes the data services interface. Further, in the above example story, line 4 corresponds to lines 58-65 of the interface below. Thus, when line 4 is invoked, the method setStoryUser is called.

```
45. public class UserSteps extends AbstractSteps{
46.
47.    private static final Log LOGGER =
        LogFactory.getLog(UserSteps.class);
48.
49.    private SessionManagerFactory sessionManagerFactory;
50.    private UserService userService;
51.    private IDfUser dfUser = null;
52.
53.    public UserSteps( ){
54.        sessionManagerFactory =
        SessionManagerFactory.getInstance( );
55.        userService = new UserService( );
56.    }
57.
58.    @When("I $user with password $password and repository
        $repository log in")
59.    @Alias("I login to repository $repository with user $user and
        password $password")
60.    public void setStoryUser(@Named("user")String
        user,@Named("password")String password,@Named("repository")
        String repository) {
61.        LOGGER.debug("@Given setStoryUser for user"+user+"
        from "+repository);
62.        User localUser = Util.getUserObject(user, password,
        repository);
63.        sessionManagerFactory.initFactory(localUser);
64.        Util.writeToExecutionContext(localUser.getUsername( ),
        localUser);
65.    }
66.
```

```
67.  @When("I connect to docbroker $docbrokerIp at
     docbrokerPort,$docbrokerPort")
68.  public void
     loginWithDocbrokerDetails(@Named("docbrokerIp")String
     docbrokerIp,@Named("docbrokerPort")String docbrokerPort){
69.      LOGGER.debug("@Given setStoryUser for
     docbrokerIp"+docbrokerIp+" from "+docbrokerPort);
70.      Docbroker myDocbroker =
     Util.getDocbrokerObject(docbrokerIp, docbrokerPort);
71.      sessionManagerFactory.initDocBroker(myDocbroker);
72.  }
73.  }
```

Continuing with the example story, lines 8-44 of the above story tests the browser code portion of the web application. The browser code portion may have a story configuration as shown in the following interface section entitled "Navigation Steps". The "Navigation Steps" interface may include additional method interfaces that are not shown. As shown in lines 74 and 75, the NavigationSteps interface has an annotation @UseStepRunnerProxy and inherits from IBrowserSteps interface. @UseStepRunnerProxy is dedicated to browser code, and, thus, causes the testing automation framework to issue the call to the web interface. Additionally, IBrowserSteps interface is also for only the browser portion of the web application. Because IBrowserSteps interface is a parent interface, the methods defined in the interface may also cause the testing automation framework to use the web interface to perform the steps. Line 8 in the Story above, matches lines 77-79 of the interface below. Thus, when the BDD framework executes line 8 of the story, the BDD framework calls the "navigateToApplicationPage" method listed in lines 77-79. The test automation framework determines that "navigateToApplicationPage" is for a browser portion, and therefore, invokes the web browser interface. Further, in the above example story, line 9 corresponds to lines 85-88 of the interface below. Thus, when line 4 is invoked, the method assertPageId is called to determine the current page.

```
74.  @UseStepRunnerProxy(classIdentifier="navigation")
75.  public interface NavigationSteps extends IBrowserSteps {
76.
77.    @When("I navigate to page $pageId")
78.    @Conditions(afterStep = @Condition(page=BOOLEAN.TRUE))
79.    public void navigateToApplicationPage(String pageId);
80.
81.    @When("I navigate to instance page $pageId with objectId
       $objectId")
82.    @Conditions(afterStep = @Condition(page=BOOLEAN.TRUE))
83.    public void navigateToInstancePage(String pageId, String
       objectId);
84.
85.    @Then("I am on page $pageId")
86.    @Conditions(beforeStep = @Condition(page=BOOLEAN.TRUE))
87.    @HasThenMethod
88.    public void assertPageId(String pageId);
89.
90.    @Then("I am on instance page $pageId of model $modelId")
91.    @Conditions(beforeStep = @Condition(page=BOOLEAN.TRUE))
92.    @HasThenMethod
93.    public void assertInstancePageId(String pageId, String modelId);
94.  }
```

Figure 6:
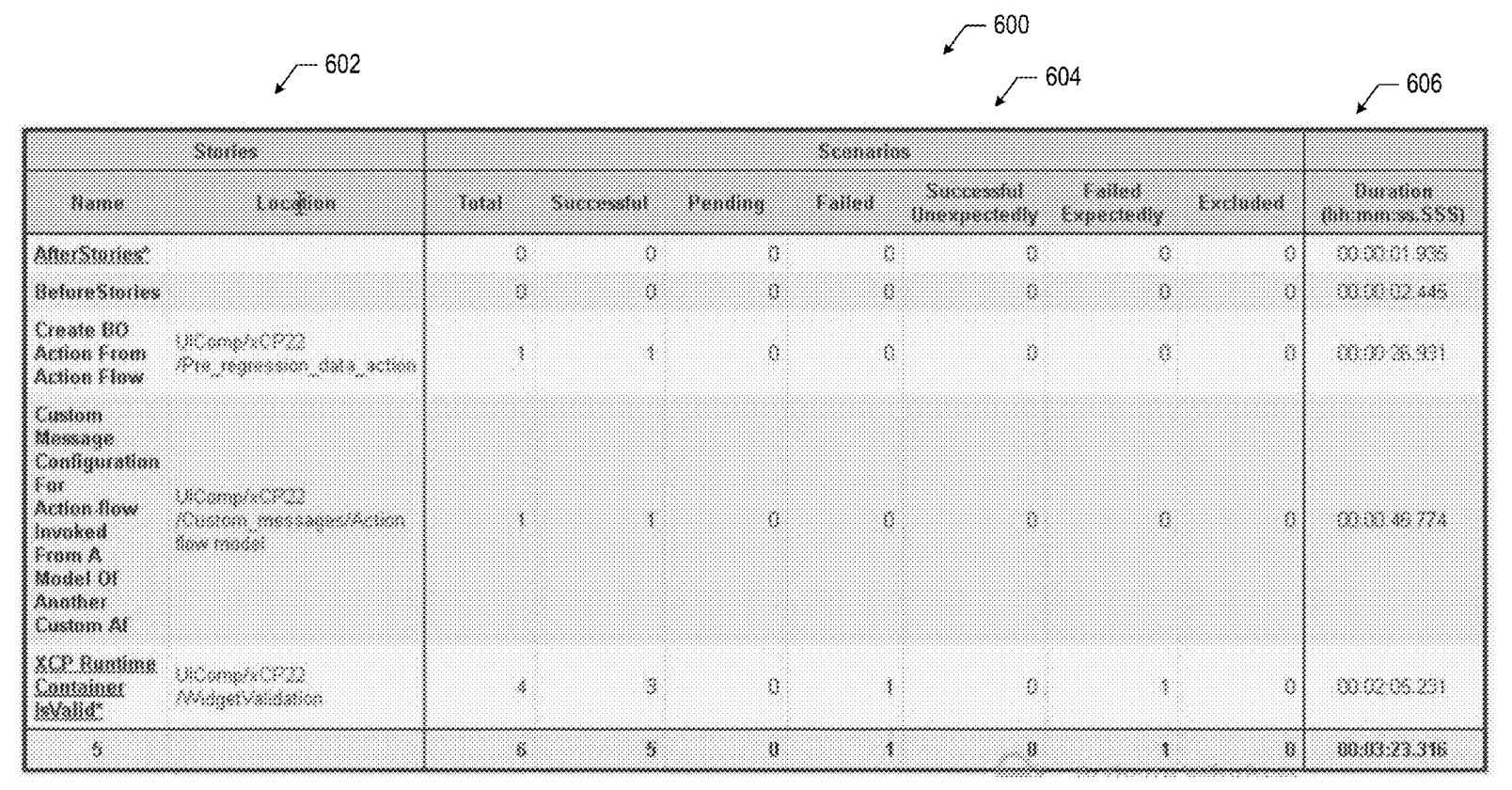

FIG. 6 shows an example report (600) in accordance with one or more embodiments of the technology. As shown in the example report, the left side (602) of the report (600) lists particular stories. The middle portion (604) of the report (600) may provide information about executing the different scenarios detailed in the corresponding story and whether the scenario executed successfully or failed. The right portion (606) of the report (600) may provide information about the time to execute each story. The bottom of the report may include totals. Other configurations of reports may be used without departing from the scope of the technology.

Figure 7:
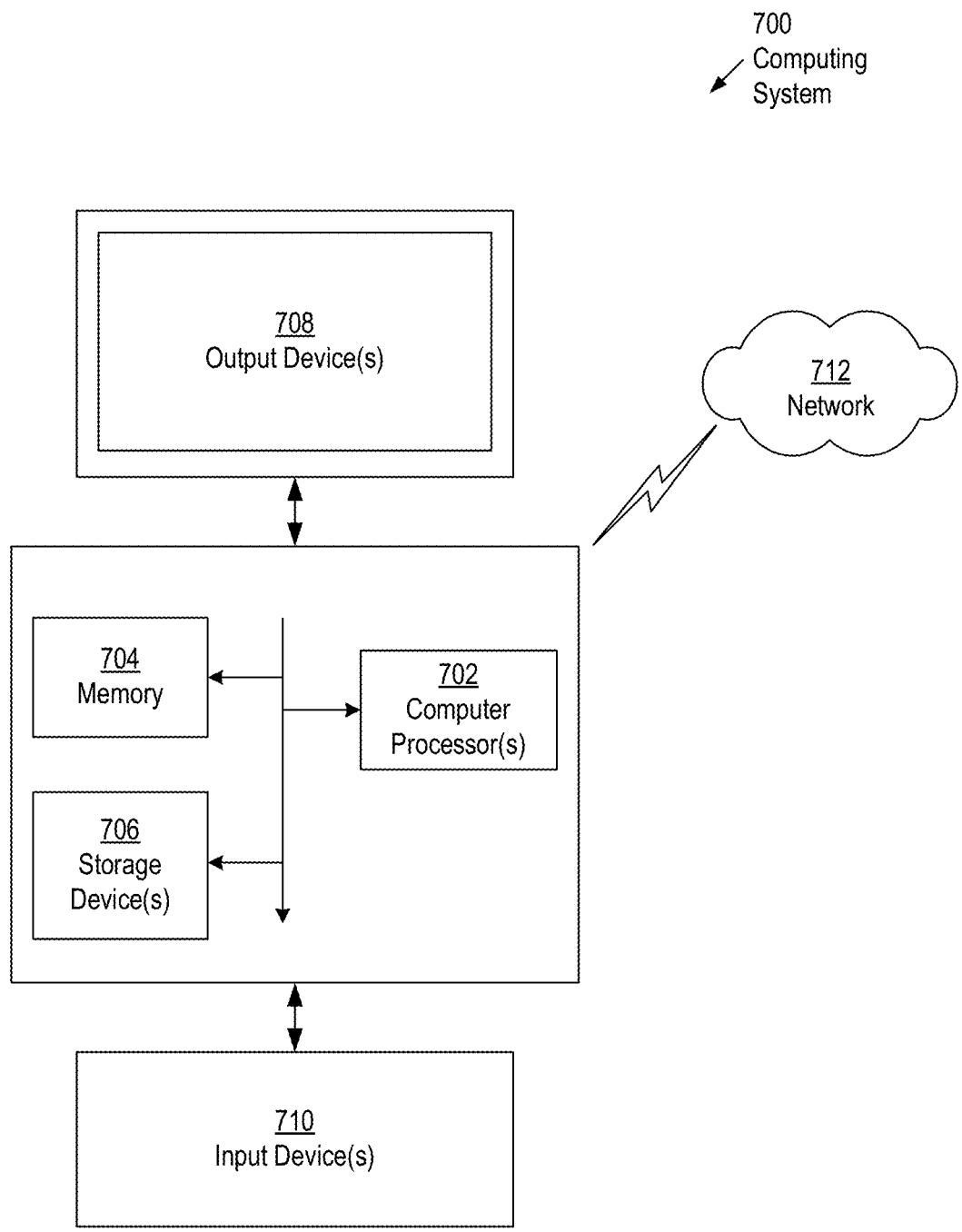
FIG. 7 shows a computing system in accordance with one or more embodiments of the technology.

Embodiments of the technology may be implemented on a computing system. Any combination of mobile, desktop, server, embedded, or other types of hardware may be used. In other words, various components of FIGS. 1 and 2 may be and/or may execute on a computing system, such as the computing system shown in FIG. 7. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for composable test automation, the method comprising:
executing a story by, for each step of a plurality of steps in the story:
receiving a call for the step in the story;
categorizing the step to identify a portion of a web application executable being tested by the step;
selecting, from a plurality of application testing interfaces, an application testing interface corresponding to the portion of the web application executable, wherein the application testing interface is a data services plug-in;
converting the call to a plurality of commands, wherein the plurality of commands tests a data services portion of the web application executable;
transmitting the plurality of commands to the application testing interface;
receiving output from the application testing interface based on executing the plurality of commands; and
transmitting the output;
generating a story report from executing the story; and
storing the story report.

2. The method of claim 1, wherein selecting the application testing interface is based on an annotation defined for the step.

3. The method of claim 1, wherein transmitting the output comprises:
displaying, during testing, the output from a user interface of the web application executable while a user-interface plug-in is submitting data via the user interface.

4. The method of claim 1, further comprising:
detecting, during executing, that the story references a story fragment of a plurality of story fragments;
obtaining the story fragment referenced by the story; and
executing the story fragment.

5. The method of claim 1, wherein the story is one of a plurality of stories, and wherein the method further comprises executing each of the plurality of stories.

6. A system comprising:
a computer processor;
a plurality of application testing interfaces, where each of the plurality of application testing interfaces are configured to interface with a corresponding portion of a web application executable;
a testing automation framework that, when executed on the computer processor, is configured to: execute a story by, for each step of a plurality of steps in a story:
receiving a call for the step in the story;
categorizing the step to identify the portion of the web application executable being tested by the step;
selecting, from the plurality of application testing interfaces, an application testing interface corresponding to the portion of the web application executable, wherein the application to testing interface is a data services plug-in;
selecting the application testing interface is based on an annotation defined for the step;
converting the call to a plurality of commands, wherein the plurality of commands tests a data services portion of the web application executable;
transmitting the plurality of commands to the application testing interface;
receiving output from the application testing interface based on executing the plurality of commands; and
transmitting the output;
generate a story report from executing the story;
and store the story report.

7. The system of claim 6, further comprising:
a behavior driven development framework configured to receive the story.

8. The system of claim 6, further comprising
a data repository configured to store the story.

9. The system of claim 6, further comprising:
a development environment configured to:
receive a web application design; and
generates the web application executable.

10. The system of claim 6, wherein transmitting the output comprises:
display, during testing, the output from a user interface of the web application executable while a user-interface plug-in is submitting data via the user interface.

11. A non-transitory computer readable medium comprising computer readable program code for:
executing a story by, for each step of a plurality of steps in the story:
receiving a call for the step in the story;
categorizing the step to identify a portion of a web application executable being tested by the step;
selecting, from a plurality of application testing interfaces, an application testing interface corresponding to the portion of the web application executable, wherein the application testing interface is a data services plug-in;
converting the call to a plurality of commands, wherein the plurality of commands tests a data services portion of the web application executable;
transmitting the plurality of commands to the application testing interface;
receiving output from the application testing interface based on executing the plurality of commands; and
transmitting the output;
generating a story report from executing the story; and
storing the story report.

12. The non-transitory computer readable medium of claim 11, wherein selecting the application testing interface is based on an annotation defined for the step.

13. The non-transitory computer readable medium of claim 11, wherein transmitting the output comprises:
displaying, during testing, the output from a user interface of the web application executable while a user-interface plug-in is submitting data via the user interface.

14. The non-transitory computer readable medium of claim 11, wherein the computer readable program code is further for:
detecting, during executing, that the story references a story fragment of a plurality of story fragments;
obtaining the story fragment referenced by the story; and
executing the story fragment.

15. The non-transitory computer readable medium of claim 11, wherein the story is one of a plurality of stories, and wherein the method further comprises executing each of the plurality of stories.

* * * * *